Dec. 13, 1949     K. FISCHER     2,490,792
FLOW METER
Filed May 15, 1944
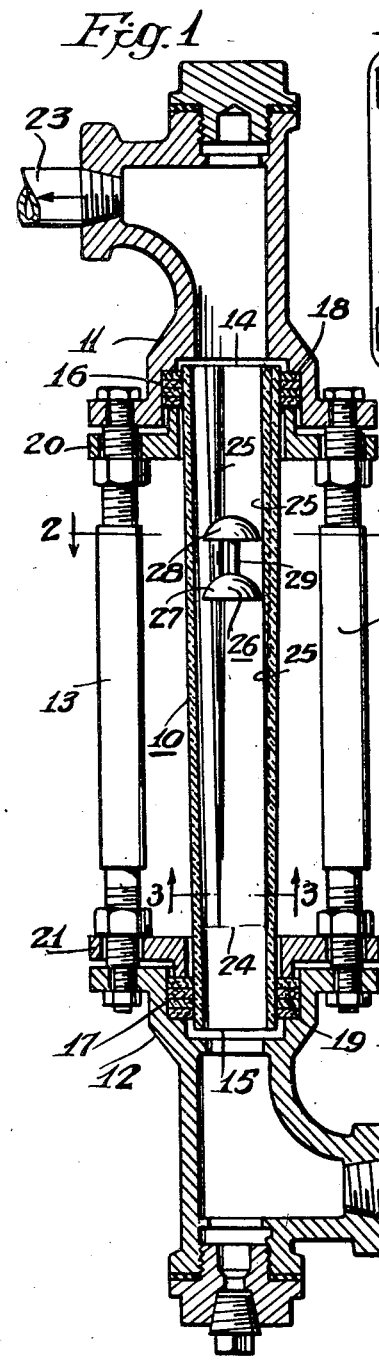
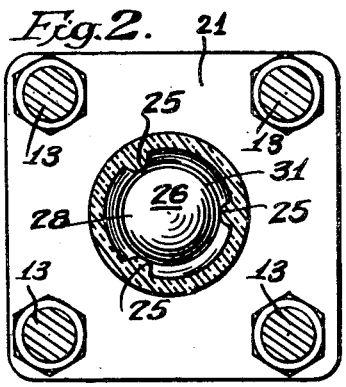
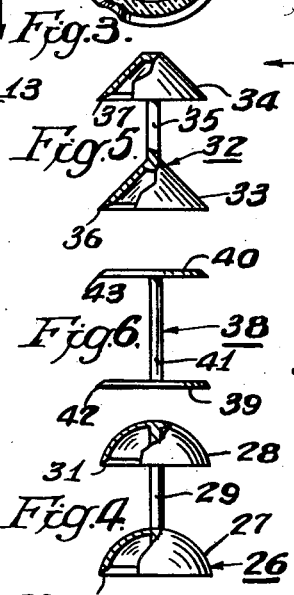
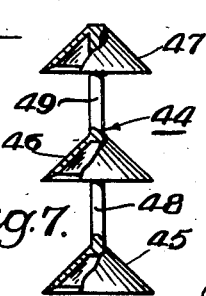
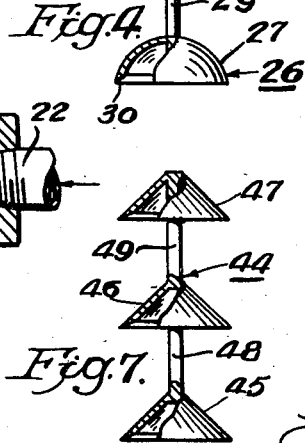
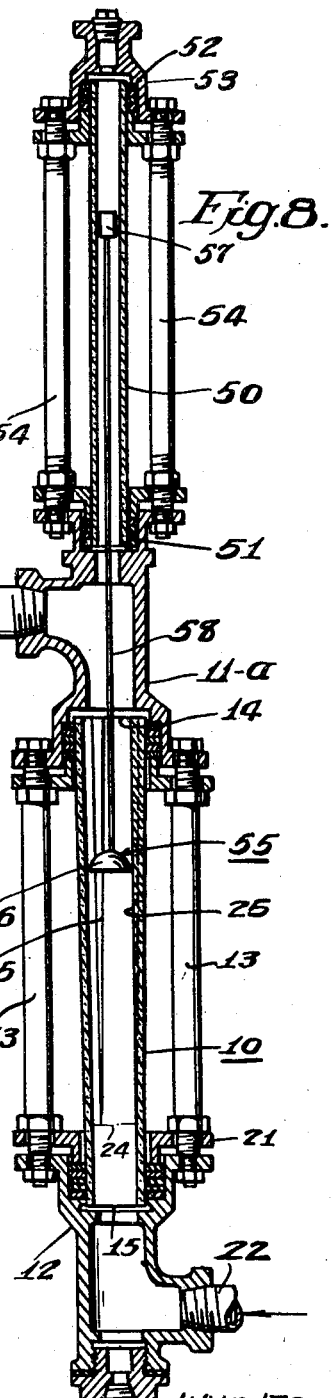
INVENTOR
BY KERMIT FISCHER
Leonard L. Kalish
Attorney Patented Dec. 13, 1949

2,490,792

UNITED STATES PATENT OFFICE 2,490,792

FLOWMETER

Kermit Fischer, Bridge Valley, Pa., assignor to Fischer & Porter Company, Hatboro, Pa., a corporation of Pennsylvania Application May 15, 1944, Serial No. 535,625

7 Claims. (Cl. 73—209)

1

The present invention relates to flow meters and relates more particularly to rotameters for measuring the rate-of-flow of a fluid.

An object of the present invention is to provide a flow meter which is more or less unaffected by changes in viscosity of the fluid being metered. Other objects, purposes and advantages of the present invention will be apparent in the following detailed description, appended claims and accompanying drawings.

In old-type rotameters embodying a float having an elongated body portion with a maximum diameter slightly less than the smallest effective diameter of the tapered metering tube, one serious disadvantage was the fact that the position of the float within the tube varied with fluctuations in the viscosity of the fluid being metered. Thus the true rate-of-flow could be determined only by maintaining a constant check on the viscosity of the fluid and by correcting the reading of the rotameter accordingly.

In my co-pending application Serial No. 409,048, filed August 30, 1941, now Patent No. 2,350,343, issued June 6, 1944, I have shown a rotameter employing a float, the position of which is more or less independent of and insensitive to variations in fluid viscosity; the float having a generally cup-shaped or concave flow-constricting head portion. So far as is now known, this cup-shaped head renders the float insensitive to variations in fluid viscosity by creating maximum turbulence in the flow-pattern.

The present invention contemplates a rotameter wherein the float is relatively insensitive to variations in viscosity and, at the same time, is positively guided and centered along the axis of the metering tube without the need for a separate guide-wire.

Generally speaking, the present invention comprehends a rotameter employing a novel turbulence-creating viscosity-insensitive metering float; and further comprehends a rotameter wherein a novel viscosity-insensitive metering float is used in conjunction with a metering tube having float-guiding beads formed thereon.

For the purpose of illustrating the invention, there are shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings, in which like reference characters indicate like parts throughout:

Figure 1 represents a vertical cross-sectional view of the rotameter forming one embodiment of the present invention.

Figure 2 represents a horizontal cross-sectional view, on an enlarged scale, generally along the line 2—2 of Figure 1.

Figure 3 represents a horizontal cross-sectional view, on an enlarged scale, generally along the line 3—3 of Figure 1.

Figure 4 represents a view partly in section and partly in elevation of the metering float shown in Figure 1.

Figure 5 represents a view generally similar to that of Figure 4 but showing another form of float.

Figure 6 represents a view generally similar to those of Figures 4 and 5 but showing still another form of float.

Figure 7 represents a view generally similar to those of Figures 4, 5 and 6 but showing still another form of metering float.

Figure 8 represents a vertical cross-sectional view of another embodiment of the present invention.

In the embodiment of Figures 1 to 4 I may provide a metering tube 10 (to be hereinbelow described in detail) which is vertically mounted intermediate the upper and lower "heads" 11 and 12 respectively of a rotameter frame; the heads 11 and 12 being held in spaced relationship by a plurality (for example four) of spacer rods 13.

The upper and lower ends of the metering tube 10 are connected in fluid-tight relationship within stuffing-boxes 16 and 17 formed in the heads 11 and 12 respectively by means of upper and lower packing rings 18 and 19 respectively and upper and lower stuffing-glands 20 and 21 respectively.

The lower head 12 is adapted to be screwthreadedly connected to an inlet pipe line 22 while the upper head 11 is similarly connected to an outlet pipe line 23; the fluid to be metered being adapted to pass upwardly through the lower head 12, the metering tube 10 and the upper head 11.

The metering tube 10 which, specifically, is the subject of my co-pending application Serial No. 535,624, filed May 15, 1944, now Patent 2,441,350, issued May 11, 1948, has a tapered inner bore extending from its upper end 14 to the point 24; the point 24 being somewhat above the lower end 15 of said metering tube 10. The lower portion of the metering tube 10, that is the portion intermediate the point 24 and the lower end 15, is provided with a cylindrical inner bore.

A plurality of uniformly-circumferentially-spaced inwardly-protruding axially-extending float-guiding beads 25 are formed upon the tapered inner bore of the metering tube 10. The beads 25 have relatively small circumferential dimension. The tips of the beads 25 extend generally parallel to the axis of the tube 10; the beads 25 being relatively pronounced at the upper larger end of the tapered bore and becoming gradually less pronounced as they extend downward along the tube until they finally fade out completely at the point 24, that is at the end of the tapered bore of said tube 10.

In other words, the tips of the beads 25 form line-contracts which extend axially in continuation of the cylindrical bore at the lower end of the tube 10.

Within the metering tube 10 is disposed a metering float 26 forming part of the present invention. The float 26 includes a lower cup-shaped flow-constricting head 27 opening downward in the direction of the on-coming fluid and a similar upper cup-shaped flow-constricting head 28 and a relatively thin connecting rod or body portion 29 extending between the heads 27 and 28; the connecting rod or body portion 29 lying generally along the axis of the tube 10. I have found it desirable to so proportion the float 26 that the vertical distance between the peripheries of the upper and lower heads 28 and 27 is generally the same as the diameter of the heads at said peripheries.

The peripheries of the heads 27 and 28, which may be beveled as at 30 and 31 respectively, pass close to the tips of the float-guiding beads 25 which thereby support the float 26 and provide line-contact centering for said float.

I have found that the double-headed metering float 26 gives extremely accurate measurements of flow-rate and is substantially unaffected by variations in fluid viscosity. That is, the use of the double cup-shaped heads (particularly where the peripheries of the heads are vertically spaced apart a distance corresponding to the diameter thereof) causes the position of the float (which can be read off against any suitable calibrations applied either directly on the transparent metering tube 10 or upon a separate scale) to be governed only by the rate-of-flow of the fluid. This, according to my theory, is due to the thorough turbulence in flow-pattern created by this novel float construction.

At the same time, the double-headed float is positively centered along the axis of the tube by the beads 25 of the metering tube 10; minimum friction or drag resulting from this guidance.

It is apparent, therefore, that the present invention provides a rotameter wherein the float measures the flow-rate accurately and independent of viscosity variations of the fluid and wherein the construction is greatly simplified because of the elimination of the centering guide-wire which heretofore was deemed desirable for centering the float and which required complex means for fastening its ends within the heads of the rotameter.

In Figure 5 I have shown a modified form of float 32 which may be employed in place of the float 26 hereinabove described. The float 32 has lower and upper flow-constricting heads connected by a relatively thin central rod or body portion 35; the lower and upper heads 33 and 34, in this case, being hollow and conical and being provided with beveled or knife-edged peripheries 36 and 37 respectively.

In Fig. 6 I have shown still another form of float 38 which may be used in place of the float 26 hereinabove described. The float 38 includes lower and upper heads 39 and 40 connected by a central rod or body 41; the heads 39 and 40, in this case, being thin, plane, transversely-extending discs provided with beveled or knife-edged peripheries 42 and 43 respectively. The thickness-to-diameter ratio of the heads 39 and 40 is preferably not more than ten percent and still more preferably not more than five percent.

In Figure 7 I have shown still another form of metering float 44 which may be employed in place of the float 26 described hereinabove. The float 44 includes lowermost, central, and uppermost heads 45, 46 and 47 respectively; the heads 45 and 46 being connected by a thin rod or body 48 and the heads 46 and 47 being connected by a thin rod or body 49. In this embodiment, the heads 45, 46 and 47 are conical resembling the heads 33 and 34 of the float 32 shown in Figure 5.

Another modification of the present invention is shown in Figure 8. This modification employs a metering tube 10, similar to that of Figure 1; the upper and lower ends 14 and 15 of the tube 10 being connected (by means of packing rings and stuffing-glands) in fluid-tight relationship inside of upper and lower stuffing-boxes 16 and 17 as described hereinabove.

In this embodiment, however, the upper head 11—a differs from the head 11 of Figure 1; an extension tube 50 (which is in axial alignment with the metering tube 10) having its lower end connected in fluid-tight relationship with a stuffing-box 51 formed in the upper end of the head 11—a. The upper end of the extension tube 50 is disposed in fluid-tight relationship within the stuffing-box 52 of an upper fitting 53 which is connected to the head 11—a by means of a plurality (for example four) of spacer rods 54.

The embodiment of Figure 8 is provided with a float 55. The float 55 includes a lowermost flow-constricting head 56 (similar to the head 27 of the float 26) which is disposed within the metering tube 10 and is adapted for free up-and-down movement within said metering tube responsive to variations in the fluid flow-rate. The float 55 may also include a weight-giving body portion 57 which is disposed within the extension tube 50 and adapted for free movement therewithin; the head 56 and the body portion 57 being connected by a thin elongated connecting rod 58.

It is apparent that the extension tube 50 will constitute a "dead" pocket of fluid when the rotameter is in use. Thus, the weight-giving body portion 57 will be immersed in the fluid to give the float 55 the required specific gravity relative to the fluid (it being necessary for the float to have a specific gravity somewhat greater than that of the fluid, or, in other words, to have negative buoyancy relative to the fluid; so that the float will remain in its lowermost position when there is no upward flow of fluid through the metering tube 10) and, at the same time, will be out of the path of the flowing fluid as is sometimes desirable in connection with the measurement of rate-of-flow.

The float 55 is maintained in its centered position along the axis of the metering tube 10. That is, the guiding beads 25 of the metering tube 10 center the head 56 while the extension tube

50 centers the rod 58 and the body portion 57 so that the float 55 is maintained in axially-centered position without "wobbling" or other undesirable oscillation or tilting.

Where the extra weight is not needed, the body portion 57 may be omitted entirely; the upper centering being accomplished by the elongated rod 58 (the extension tube 50, in this case, being made with a smaller diameter).

The present construction is superior to conventional float-guiding wires or rods heretofore employed in that, the present construction minimizes "sticking" or "binding" of the float and gives more accurate measurements. That is, in conventional rotameters employing float-guiding wires or rods, there is a tendency for solid materials to settle in the guide-hole of the float and around the guide-wire or rod after continued use of the rotameter; thus causing friction and binding or sticking of the float on the guide-wire. As a result, in these conventional constructions, the rotameter float does not assume its true position so that the reading of the float is not a correct indication of the fluid flow-rate.

Furthermore, in conventional constructions wherein the metering tube does not have the novel float-guiding beads of the present invention, there is a tendency for solid matter to settle on the surface of the tube which further tends to cause sticking or binding of the float. In the novel beaded tube construction of the present invention, on the other hand, this tendency is eliminated since movement of the float along the small tips of the beads will keep the latter clean and free from sediment; the flow-constricting periphery of the float being kept away from the main wall of the rotameter tube by said beads.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent is:

1. A fluid flow meter comprising a vertical metering chamber provided with a plurality of circumferentially-spaced axially-extending inwardly-protruding float-guiding beads formed thereon, said beads having convex cross-section and relatively small circumferential dimension, and a metering float adapted for free up-and-down movement within said chamber responsive to variations in rate-of-flow of fluid through said chamber, said float having a plurality of vertically-spaced transversely-extending imperforate flow-constricting equal-diameter head portions and having a relatively thin central rod portion interconnecting successive head portions, the tips of said beads extending generally parallel to the axis of said chamber and passing closely adjacent the peripheries of said head portions and said beads providing relatively frictionless float-centering line-contact therebetween, said head portions being in the form of concave fluid-entrapping pockets opening toward the inlet end of said chamber.

2. A fluid flow meter comprising a vertical metering chamber provided with a plurality of circumferentially-spaced axially-extending inwardly-protruding float-guiding beads formed thereon, said beads having convex cross-section and relatively small circumferential dimension, and a metering float adapted for free up-and-down movement within said chamber responsive to variations in rate-of-flow of fluid through said chamber, said float having a plurality of vertically-spaced transversely-extending imperforate flow-constricting equal-diameter head portions and having a relatively thin central rod portion interconnecting successive head portions, the tips of said beads extending generally parallel to the axis of said chamber and passing closely adjacent the peripheries of said head portions, the peripheries of said head portions and said beads providing relatively frictionless float-centering line-contact therebetween, said head portions being in the form of concave generally frusto-conical pockets opening toward the inlet end of said chamber.

3. A fluid flow meter comprising a vertical metering chamber provided with a plurality of circumferentially-spaced axially-extending inwardly-protruding float-guiding beads formed thereon, said beads having convex cross-section and relatively small circumferential dimension, and a metering float adapted for free up-and-down movement within said chamber responsive to variations in rate-of-flow of fluid through said chamber, said float having a plurality of vertically-spaced transversely-extending imperforate flow-constricting equal-diameter head portions and having a relatively thin central rod portion interconnecting successive head portions, the tips of said beads extending generally parallel to the axis of said chamber and passing closely adjacent the peripheries of said head portions, the peripheries of said head portions and said beads providing relatively frictionless float-centering line-contact therebetween, said head portions being in the form of concave generally hemi-spherical fluid-entrapping pockets opening toward the inlet end of said tube.

4. For use in a rotameter or the like, a metering float comprising three equally vertically-spaced transversely extending imperforate generally identical head portions and a relatively thin central rod portion interconnecting said head portions, said head portions being in the form of concave generally frusto-conical pockets.

5. For use in a rotameter or the like, a metering float comprising a plurality of vertically-spaced transversely-extending imperforate equal-diameter head portions and a relatively thin central rod portion interconnecting successive head portions, said head portions being in the form of concave pockets.

6. For use in a rotameter or the like, a metering float comprising a plurality of vertically-spaced transversely-extending imperforate equal-diameter head portions and a relatively thin central rod portion interconnecting successive head portions, said head portions being in the form of concave generally frusto-conical pockets.

7. For use in a rotameter or the like, a metering float comprising a plurality of vertically-spaced transversely-extending imperforate equal-diameter head portions and a relatively thin central rod portion interconnecting successive head portions, said head portions being in the form of concave generally hemi-spherical pockets.

KERMIT FISCHER.

(References on following page)

REFERENCES CITED

The following references are of record in the file of this patent:

UNITED STATES PATENTS

| Number | Name | Date |
|---|---|---|
| 132,344 | Wood | Oct. 15, 1872 |
| 1,565,866 | Schroeder | Dec. 15, 1925 |
| 1,580,678 | Roucka | Apr. 13, 1926 |
| 2,091,792 | Niesemann | Aug. 31, 1927 |
| 2,209,739 | Meyer | July 30, 1940 |
| 2,323,320 | Fischer | July 6, 1943 |
| 2,333,884 | Porter | Nov. 9, 1943 |
| 2,350,343 | Fischer | June 6, 1944 |
| 2,354,255 | Gillum et al. | July 25, 1944 |
| 2,377,861 | Brewer | June 12, 1945 |
| 2,384,800 | Cox | Sept. 18, 1945 |
| 2,388,672 | Brewer | Nov. 13, 1945 |
| 2,389,957 | Cox | Nov. 27, 1945 |
| 2,391,852 | Winton | Dec. 25, 1945 |
| 2,441,350 | Fischer | May 11, 1948 |

FOREIGN PATENTS

| Number | Country | Date |
|---|---|---|
| 2,428 | Great Britain | A. D. 1879 |
| 25,809 | Germany | Feb. 4, 1884 |